United States Patent
Baker et al.

(10) Patent No.: US 7,539,289 B2
(45) Date of Patent: May 26, 2009

(54) SELECTIVE DEACTIVATION OF A VOICEMAIL SYSTEM

(75) Inventors: La Veria Baker, Atlanta, GA (US); David Scott, Norcross, GA (US)

(73) Assignee: AT&T Intellectual Porperty I, L.P., Reno, NV (US)

( * ) Notice: Subject to any disclaimer, the term of this patent is extended or adjusted under 35 U.S.C. 154(b) by 551 days.

(21) Appl. No.: 11/206,433

(22) Filed: Aug. 18, 2005

(65) Prior Publication Data

US 2006/0062357 A1    Mar. 23, 2006

Related U.S. Application Data

(63) Continuation of application No. 10/180,258, filed on Jun. 26, 2002, now Pat. No. 6,985,563.

(51) Int. Cl.
    *H04M 1/64* (2006.01)

(52) U.S. Cl. .................... 379/76; 379/88.12; 379/88.26

(58) Field of Classification Search ........................ None
    See application file for complete search history.

(56) References Cited

U.S. PATENT DOCUMENTS

| | | | |
|---|---|---|---|
| 5,521,964 A | 5/1996 | Schull et al. | 379/88.12 |
| 5,734,710 A | 3/1998 | Hirth et al. | 379/229 |
| 5,850,435 A | 12/1998 | Devillier | 379/374.02 |
| 5,905,774 A | 5/1999 | Tatchell et al. | 379/88.04 |
| 5,944,786 A | 8/1999 | Quinn | 709/206 |
| 5,999,611 A | 12/1999 | Tatchell et al. | 379/211.02 |
| 6,032,039 A | 2/2000 | Kaplan | 455/413 |
| 6,173,047 B1 * | 1/2001 | Malik | 379/207.11 |
| 6,188,757 B1 * | 2/2001 | Malik | 379/207.02 |
| 6,389,117 B1 | 5/2002 | Gross et al. | 379/88.23 |
| 6,389,276 B1 * | 5/2002 | Brilla et al. | 455/413 |
| 6,449,479 B1 | 9/2002 | Sanchez | 455/433 |

(Continued)

OTHER PUBLICATIONS

Office Action Summary issued Oct. 1, 2003 in connection with U.S. Appl. No. 10/180,258.

(Continued)

*Primary Examiner*—Curtis Kuntz
*Assistant Examiner*—Joseph T Phan
(74) *Attorney, Agent, or Firm*—Thomas, Kayden, Horstemeyer, & Risley, LLP

(57) ABSTRACT

A method and system are provided for allowing a subscriber of voicemail services to selectively deactivate a voicemail system and to designate a reviewed voicemail message as "unheard." A subscriber to voicemail services provided by a telecommunications network-based system contacts the voicemail system and deactivates voicemail services temporarily or indefinitely. Subsequent callers forwarded to the subscriber's voicemail box at the voicemail system receive an announcement that the called party is not presently accepting voicemail messages. Alternatively, no announcement is provided to the calling party, and the calling party simply receives a busy signal or an unanswered call indication. Once the subscriber is ready to begin receiving messages in her voicemail box, the subscriber may reactivate the voicemail system. If the subscriber does accept voicemail messages, and the subscriber receives and reviews voicemail messages, the subscriber may designate any reviewed message as "unheard" so that an audible or visual indication of the presence of voicemail message is reactivated to subsequently alert the subscriber or other user of the presence of voicemail messages in the subscriber's voicemail box.

18 Claims, 4 Drawing Sheets

U.S. PATENT DOCUMENTS

| | | | | |
|---|---|---|---|---|
| 6,622,016 B1 * | 9/2003 | Sladek et al. | ............ | 455/414.1 |
| 2002/0112007 A1 * | 8/2002 | Wood et al. | ................. | 709/206 |
| 2004/0136505 A1 * | 7/2004 | Garg et al. | ............... | 379/88.12 |
| 2005/0100143 A1 * | 5/2005 | Bedingfield | .............. | 379/88.12 |

OTHER PUBLICATIONS

Office Action Summary issued Oct. 20, 2004 in connection with U.S. Appl. No. 10/180,258.

Office Action Summary issued Jun. 17, 2005 in connection with U.S. Appl. No. 10/180,258.

* cited by examiner

SELECTIVE DEACTIVATION OF A VOICEMAIL SYSTEM

CROSS REFERENCE TO RELATED APPLICATIONS

This application is a continuation of application Ser. No. 10/180,258, entitled "Selective Deactivation of a Voicemail System" filed on Jun. 26, 2002, now U.S. Pat. No. 6,985,563 which is hereby incorporated by reference.

FIELD OF THE INVENTION

The present invention relates to a method and system for selectively deactivating the services of a voicemail system and for designating a reviewed voicemail message as "unheard."

BACKGROUND OF THE INVENTION

In modern telecommunications systems, network-based voicemail systems provide subscribers the ability to receive and review saved voice messages left by calling parties when the subscriber's telephone is busy or is unanswered. In a typical telecommunications system network-based voicemail system, the voicemail system is operated remotely from the subscriber's telephone and is a part of the overall telecommunications network in which the subscriber's telephone operates. If the subscriber's telephone is busy, unanswered, switched to an "off" position, or has a loss of power, the voicemail system still may receive messages directed to the subscriber's directory number so long as the voicemail system in the overall telecommunications network is operating properly. Accordingly, the subscriber is unable to exercise local control over whether the subscriber receives voicemail messages from calling parties.

Often, a subscriber would prefer that no voicemail messages are left for the subscriber during a certain period of time. For example, the subscriber may be ill, or the subscriber may be on vacation, and the subscriber would rather not receive voicemail messages during that period. If the subscriber is on vacation for several days, the calling parties leaving messages for the subscriber may believe that leaving the messages will precipitate some definite response or action from the subscriber simply by leaving the messages for the subscriber. If the subscriber does not check her messages during the period of her vacation, she may miss an important deadline for action, and the calling party who left the message for the subscriber may be disappointed or adversely affected in some manner. Accordingly, there is a need for a method and system for allowing a voicemail subscriber to selectively deactivate her voicemail system so that the voicemail system will not accept voicemail messages from an incoming calling party directed to the subscriber.

In a typical voicemail system, once a voicemail message has been left for the subscriber, some audible or visual indication of the voicemail message is presented to the subscriber. That is, a flashing light, or audible tone is presented to the subscriber to alert the subscriber of a waiting voicemail message. Once the subscriber listens to her voicemail messages, the audible or visual message indicator is typically discontinued. If the subscriber inadvertently listens to a message directed to the subscriber's associate, roommate, or other person authorized to receive voicemail messages over the subscriber's voicemail system, the person to whom the voicemail message was actually directed will not receive the audible or visual indication that the voicemail message is waiting. Consequently, the person to whom the voicemail message was directed may not know to check for messages. Similarly, often a subscriber to voicemail services uses her voicemail system as a place for saving a reminder message, or the subscriber may simply wish to keep a message stored in her voicemail system for later review. If the audible or visual indication of a waiting voicemail message is no longer presented for a voicemail message reviewed by the subscriber, the subscriber may not remember to recheck the messages to review the saved information. Accordingly, there is a need for a method and system for designating a reviewed voicemail message as "unheard" so that the audible or visual indication of the waiting voicemail message is reactivated to alert the subscriber of the presence of the voicemail message. It is with respect to these and other considerations that the present invention has been made.

SUMMARY OF THE INVENTION

Embodiments of the present invention are directed to a method and system for allowing a subscriber of voicemail services to selectively deactivate a voicemail system and to a method and system for designating a previously-reviewed voicemail message as "unheard." A subscriber to voicemail services provided by a telecommunications network-based system contacts the voicemail system and activates a voicemail deactivation service. Subsequent callers forwarded to the subscriber's voicemail box at the voicemail system receive an announcement that the called party is not presently accepting voicemail messages. Alternatively, no announcement is provided to the calling party, and the calling party simply receives a busy signal or an unanswered call indication (unending ring). Once the subscriber is ready to begin receiving messages in her voicemail box, the subscriber may reactivate the voicemail system. The deactivation method and system may be set up and operated at the voicemail system, or the deactivation method and system may be controlled by the telecommunications system network in which the voicemail system operates.

According to another embodiment, if the subscriber does accept voicemail messages, and the subscriber receives and reviews voicemail messages, the subscriber may designate any reviewed message as "unheard" so that an audible or visual indication of the presence of voicemail message is reactivated to subsequently alert the subscriber or other user of the presence of voicemail messages in the subscriber's voicemail box.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for selective deactivation of a telecommunications network-based voicemail system and to a method and system for designating a reviewed voicemail message as "unheard" so that an audible or visual indication of the presence of the voicemail message is presented to a subscriber or other user of the voicemail system.

Operating Environment

Figure 1:
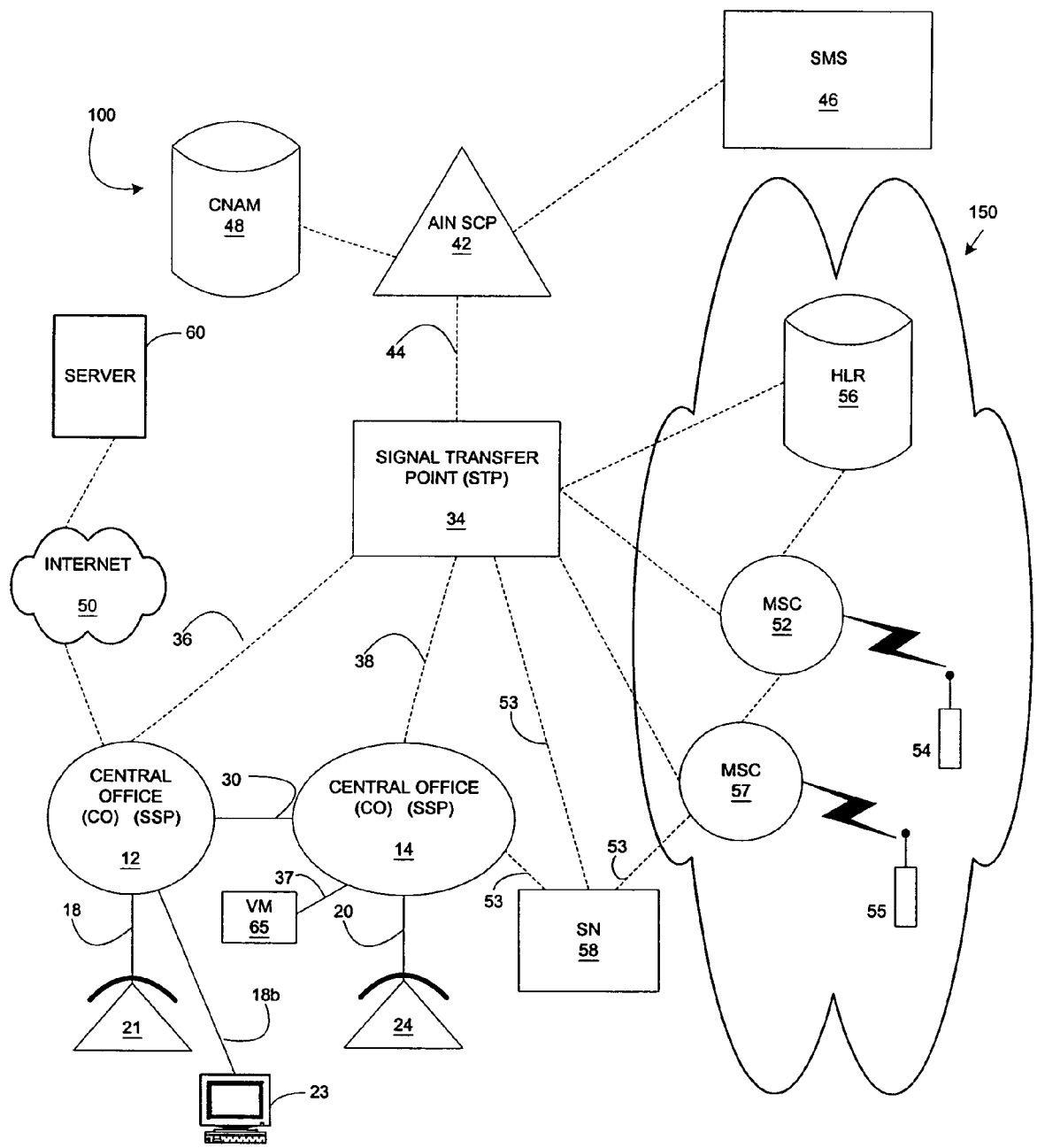
FIG. 1 is a simplified block diagram illustrating components of a wireline and wireless telecommunications network that provides an operating environment for the present invention.

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line 18(b). The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36, 38 and 40. Both the regional SCPs and the local SCP 42, which represent a plurality of local SCPs distributed throughout the AIN, are connected via respective data links to the SMS 46. The SMS 46 provides a centralized platform for remotely programming the various SCPs of the AIN so that a coordinated information processing scheme may be implemented for the AIN.

The modern Advanced Intelligent Network also includes service nodes (SN) such as the service node 58. Those skilled in the art are familiar with service nodes, which are physically implemented by the same types of computers that embody the SCP 42. In addition to the computing capability and data base maintenance features, service nodes 58 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 53 to SSP 12, ISDN/SS7 protocol conversion in SSP 12, and SS7 links 38 and 44. According to a preferred embodiment, the ISDN links 53 serve as a primary rate interface (PRI) over which services may be provided to subscribers using wireline services such as the wireline telephone sets 21 and 24 and subscribers using wireless services such as the wireless units 54, 55, 60, and 62.

The voicemail system 65 is shown in FIG. 1 being functionally connected to the switch 14 and is a component of the network. That is, calls are routed to and from the voicemail system 65 at the control and direction of the network via such components as the SCP 42. The voicemail system 65 may be connected to the switch 14 via a PRI interface line 37 similar to the connection of the service node 58 to the switch 14. In operation, the voicemail system 65 is treated like a switch 14 whereby calls directed to voicemail boxes maintained at the voicemail system 65 are directed to the voicemail system 65 as calls are directed to customer premises equipment, such as telephones, via switches 12, 14.

The voicemail system 65 typically includes a computer or collection of computers, recording and recording playback devices, and software for recording announcements for incoming calls, recording and playing back recorded messages, and for receiving incoming calls and for making outgoing calls at the direction of the network. In addition to the recording and playback functionality, the voicemail system 65 includes text-to-speech (TTS) and speech-to-text (STT) synthesis devices and software for conversion of analog voice messages to digitized forms such as WAV files and MP3 files. The voicemail system 65 has memory capacity for saving announcements to incoming callers and for saving messages from incoming callers. The computing system of the voicemail system 65 also includes an electronic mail server that may send and receive electronic mail via the network and the Internet 50.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 60 is illustrative of a computing system accessible via a distributed computing environment such as the Internet 50. The server 60 may include a computer or collection of computers along with associated software applications and memory capacity. The server 60 may serve as an Internet web server for maintaining and administering Internet web pages serving as an access point to the functionality of the present invention via the computer 23. For example, a user may use the computer 23 to access the functionality of the present invention by accessing an Internet web page maintained at the server 60 and operated by the provider of the functionality.

The wireless network 150, such as a cellular network, comprises a mobile switching center (MSC) 52. The MSC 52 is a switch providing services and coordination between wireless users in the network 150 and external networks. The MSC 52 may be connected to the STP 34 to provide information to the wireline network and receive information from the wireline network. The MSC 52 also communicates with a wireless subscriber, such as wireless telephones 54 and 55. The wireless telephones 54 and 55 are also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Operation

Having described an operating environment for the present invention with reference to FIG. 1, the following is a description of a logical flow of the steps performed by a method and system of the present invention for voicemail system-based deactivation of voicemail services. Selective deactivation of voicemail services provided by the voicemail system 65 may be accomplished at the voicemail system 65 or the selective deactivation may be accomplished under the control of the network, described above. The network-based control of selective deactivation of voicemail services is described with reference to FIG. 3 below. The following description of FIG. 2 is in reference to deactivation and reactivation of voicemail services under the control of the voicemail system 65.

Figure 2:
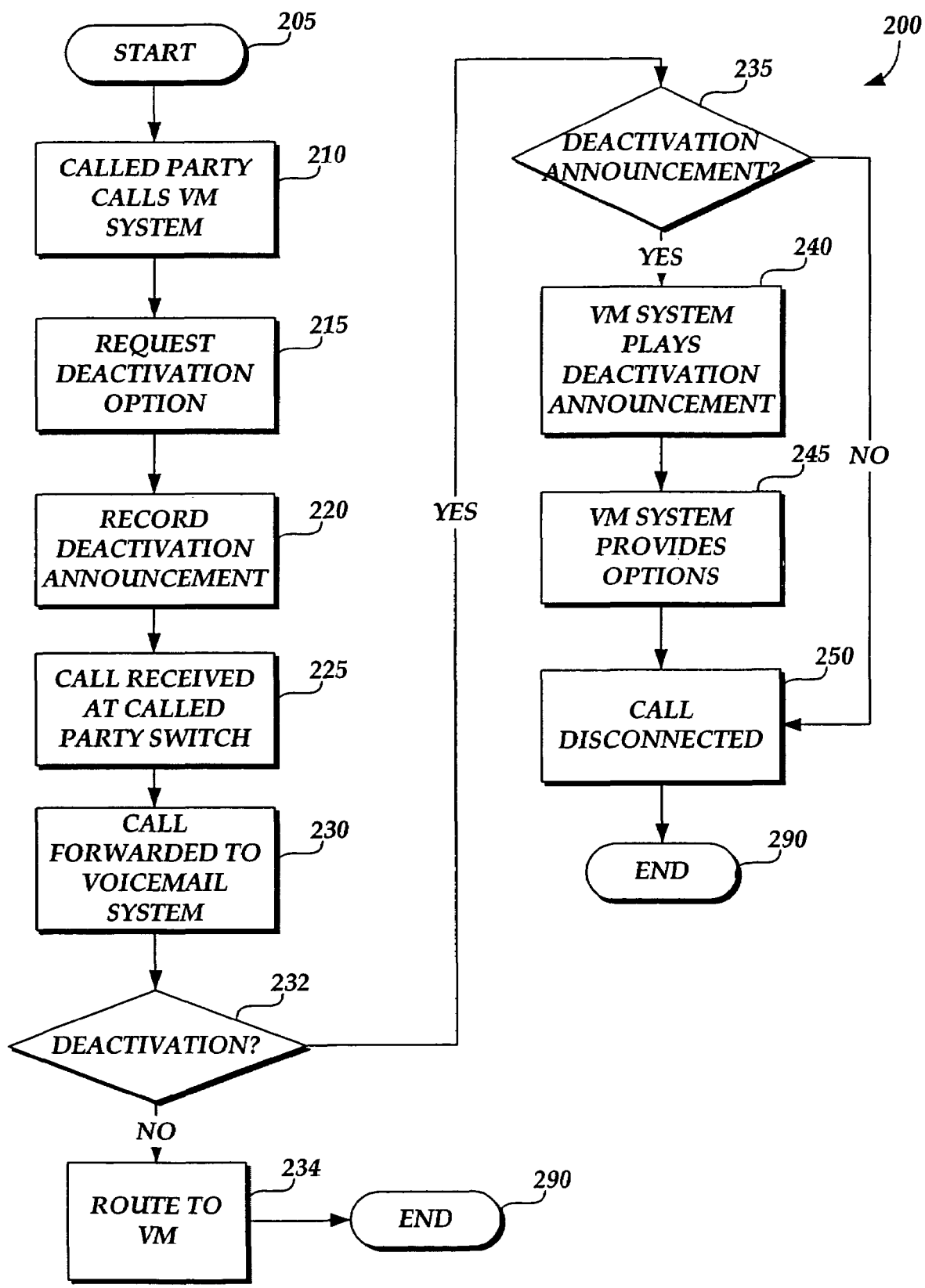
FIG. 2 illustrates a logical flow of the steps performed by a method and system of the present invention for deactivation of voicemail services provided by the voicemail system.

Referring then to FIG. 2, the method 200 begins at start step 205 and proceeds to step 210 where a subscriber or called party contacts the voicemail system 65 in order to deactivate the voicemail services of the voicemail system 65 subscribed to by the called party. According to one embodiment of the present invention, the called party may dial a prescribed telephone number for accessing the voicemail system 65 to affect changes to the subscriber's voicemail services. Once the subscriber is connected to the voicemail system 65, the subscriber may receive a variety of voicemail prompts such as a prompt for changing the subscriber's voicemail greeting, or for deleting existing voicemail messages, and the like. At step 215, the subscriber is provided a prompt asking the subscriber whether the subscriber would like to deactivate voicemail services. If the subscriber responds affirmatively, at step 220, the subscriber is given the option of leaving a deactivation announcement such as "I will not be accepting voicemail messages for the next week." Alternatively, the subscriber may decide to leave no deactivation announcement so that incoming callers during the deactivation period will simply receive a busy signal or unanswered call indication. Additionally, the subscriber may set a specific duration for deactivation of voicemail services, such as one day, one week, etc.

According to an alternate embodiment, the subscriber may contact the voicemail system 65 at step 210 and request a deactivation option at step 215 via an Internet-based web page operated by the telecommunications service provider in which the voicemail system 65 operates. As shown in FIG. 1, the telecommunications service provider may operate an Internet-based web page at the server 60 for access by the subscriber via the Internet 50 from the subscriber's computer 23. According to this embodiment, the subscriber may open a voicemail services web page operated by the telecommunications service provider to request deactivation of the subscriber's voicemail services and to provide a deactivation announcement, if desired, and a deactivation period duration. In either case, if no deactivation period duration is prescribed by the subscriber, deactivation of the subscriber's voicemail services will continue until those services are reactivated by the subscriber.

Once the subscriber's voicemail services have been deactivated, as described above, calls directed to the subscriber's telephone directory number are forwarded to the voicemail system 65, but those calls are treated according to the voicemail services deactivation instructions provided by the subscriber. At step 225, a calling party places a call to the subscriber or called party after the subscriber has deactivated her voicemail services, as described above. When the call from the calling party is received at the subscriber's switch 14 and receives an indication that the call should be forwarded to the voicemail system 65, the call is forwarded to the voicemail system 65 so that the calling party may leave a voicemail message to the subscriber.

At step 232, a determination is made as to whether the voicemail services of the subscriber have been deactivated by the subscriber. If voicemail services have not been deactivated by the subscriber with reference to steps 210, 215, and 220, the method proceeds to step 234, and the call is routed to the subscriber's voicemail box so that the calling party may leave a voicemail message to the subscriber according to normal voicemail call processing. The method ends at step 290.

If the subscriber has deactivated her voicemail services, as described with reference to steps 210-220, the method proceeds to step 235, and a determination is made as to whether a deactivation announcement has been prepared by the subscriber for presentation to calling parties. If no deactivation announcement has been prepared by the subscriber, the method proceeds to step 250 and the call is disconnected. That is, at step 250, the calling party will be presented with a busy signal or with an unanswered call indication (unending ring) so that the calling party will terminate the call attempt. As should be understood by those skilled in the art, there may be times when the subscriber believes that a deactivation announcement may be offensive to some calling parties. Accordingly, the subscriber may decide to leave no deactivation announcement so that calling parties simply receive a busy signal or unanswered call indication.

If a deactivation announcement has been prepared by the subscriber for presentation to calling parties, the method proceeds to step 240, and the voicemail system 65 plays the deactivation announcement to the calling party. For example, the calling party may be provided with an announcement such as "I will not be accepting voicemail messages for the next week while I am on vacation." After the deactivation announcement is played to the calling party, the method proceeds to step 245, and the voicemail system 65 provides options to the calling party such as "press 1 to hear the announcement again, or press 2 to disconnect the call." The method then proceeds to step 250 and the call is disconnected. The method ends at step 290.

Figure 3:
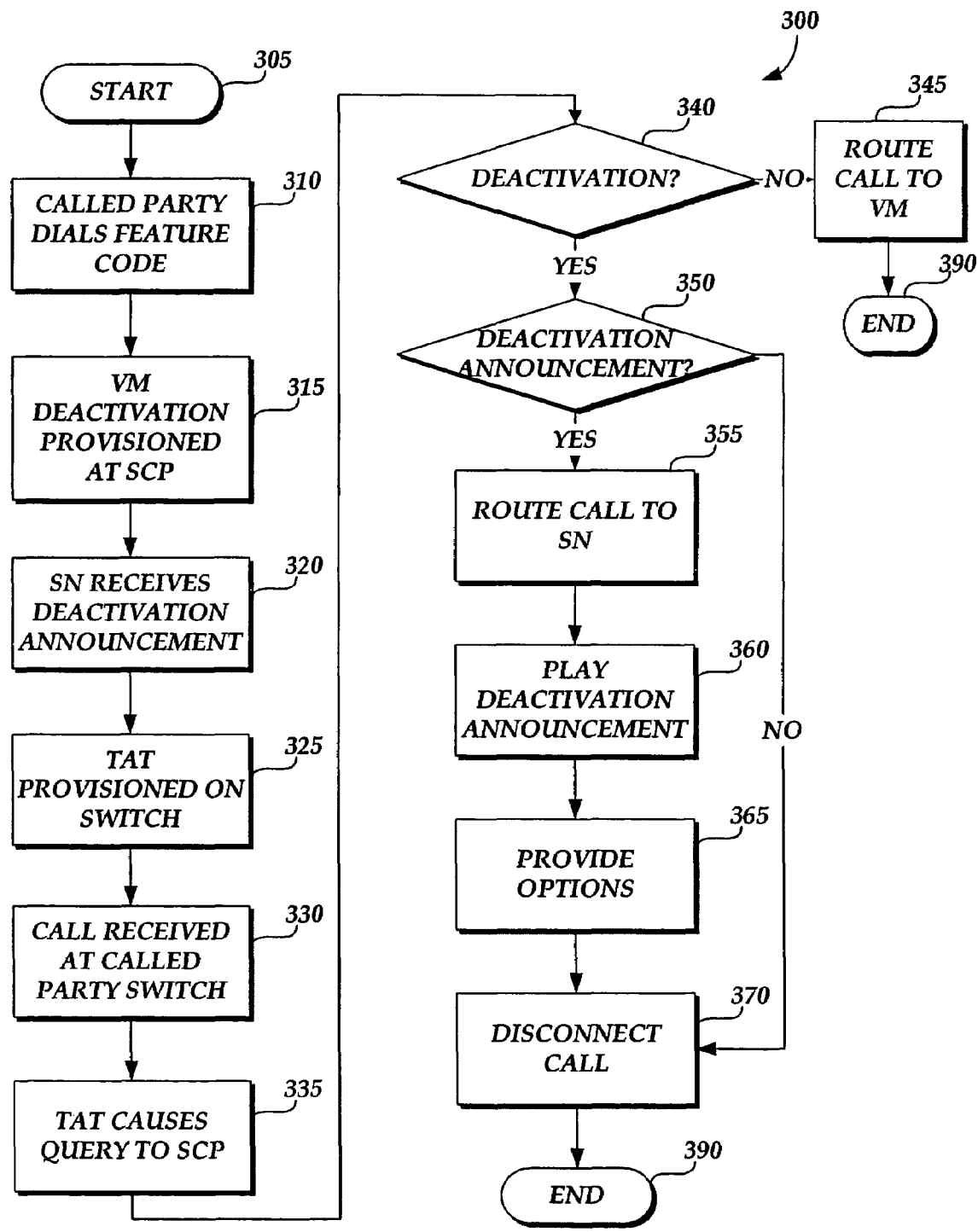
FIG. 3 illustrates a logical call flow of the steps performed by a method and system for telecommunications network deactivation of voicemail services provided by a voicemail system.

As briefly described above, selective deactivation of voicemail services in accordance with the present invention may be controlled by the network in which the voicemail system 65 operates. FIG. 3 illustrates a logical call flow of the steps performed by a method and system for telecommunications network deactivation of voicemail services provided by a voicemail system. The method 300 begins at start step 305 and proceeds to step 310 where the subscriber contacts the network to request deactivation of the subscriber's voicemail services. At step 310, the subscriber may dial a feature code such as *35 that will connect the subscriber to a network control component such as the service control point 42. At step 315, the subscriber may request deactivation of her voicemail services.

Once the subscriber is connected to the service control point 42, the subscriber may be provided with options including the recording of a deactivation announcement, as described above with reference to FIG. 2. According to this embodiment, at step 320, the service control point 42 may connect the subscriber to a separate network component such as the service node 58 from which the subscriber may receive interactive voice instructions and input methods. For example, the service node may play a message to the subscriber such as "if you would like to deactivate your voicemail services, press 1." The service node 58 may then prompt the subscriber that "if you would like to record a deactivation announcement, please speak the announcement after the tone." Alternatively, the subscriber may contact the network at step 310 via an Internet-based web page operated by the telecommunications service provider of the network, as described above with reference to FIG. 2.

At step 325, after voicemail services deactivation is provisioned at a network control component such as the service control point 42, a termination attempt trigger (TAT) is provisioned on the subscriber's switch 12 in order to direct subsequent calls to the subscriber's telephone directory number to the service control point 42 for provision of the deactivation service requested by the subscriber. Accordingly, calls received at the subscriber's switch 12 during the deactivation period will now be treated according to the deactivation of voicemail services requested by the subscriber.

At step 330, a call is placed by a calling party to the subscriber's telephone directory number and is received at the subscriber's or called party's switch 12. At step 335, the termination attempt to trigger provisioned at the subscriber's switch 12 is fired and causes a query to be sent to the service control point 42 for provision of services associated with that termination attempt trigger. At step 340, a database lookup is performed at the service control point 42 to determine what services are associated with the termination attempt trigger fired at the subscriber's switch 12. A determination is made at the service control point 42 as to whether the subscriber has deactivated her voicemail services with reference to steps 310-320. If the subscriber has not deactivated her voicemail services, the method proceeds to step 345, and the call from the calling party is routed to the voicemail system 65 where the calling party may leave a message for the subscriber according to normal voicemail system call routing procedures. The method ends at step 390.

If the service control point 42 determines that the voicemail services of the subscriber have been deactivated, the method proceeds to step 350, and a determination is made as to whether a deactivation announcement has been prepared by the subscriber for presentation to calling parties. As described above, often the subscriber may not wish to leave a deactivation announcement if the subscriber believes that the deactivation announcement may be offensive to some calling parties, or that a deactivation announcement is not necessary under the subscriber's particular circumstances. If no deactivation announcement is to be provided to the calling party, the method proceeds to step 370 and the call is disconnected. As described with reference to FIG. 2, prior to disconnecting the call, the calling party may be provided with a busy signal or with an unanswered call indication.

Referring back to step 350, if a deactivation announcement has been prepared for presentation to calling parties, the method proceeds to step 355. At step 355, the service control point routes the call from the calling party to a network component, such as the service node 58, for provision of the deactivation announcement and associated options to the calling party. As should be understood by those skilled in the art, the deactivation announcement and options may be provided to the calling party at another network device, including the subscriber switch 12 and the voicemail system 65.

At step 360, the deactivation announcement prepared by the subscriber is played to the calling party. At step 365, additional options are provided to the calling party such as "press 1 to hear the deactivation announcement again, or press 2 to disconnect the call." At step 370, the call is disconnected, and the method ends at step 390.

In either case, described with reference to FIGS. 2 and 3 above, the subscriber may choose to reactivate voicemail services at any time. Reactivation of voicemail services is performed in the same manner as deactivation of voicemail services. That is, the subscriber may call into the voicemail system 65, or the subscriber may access the functionality of the voicemail system 65 via an Internet-based web site, or via the network. Once the subscriber has accessed the functionality of the voicemail system 65, the subscriber may direct that the voicemail services be reactivated. For example, with reference to FIG. 2, the subscriber may call the voicemail system 65, and the subscriber may be provided a prompt such as "to reactivate voicemail services, press 4."

Figure 4:
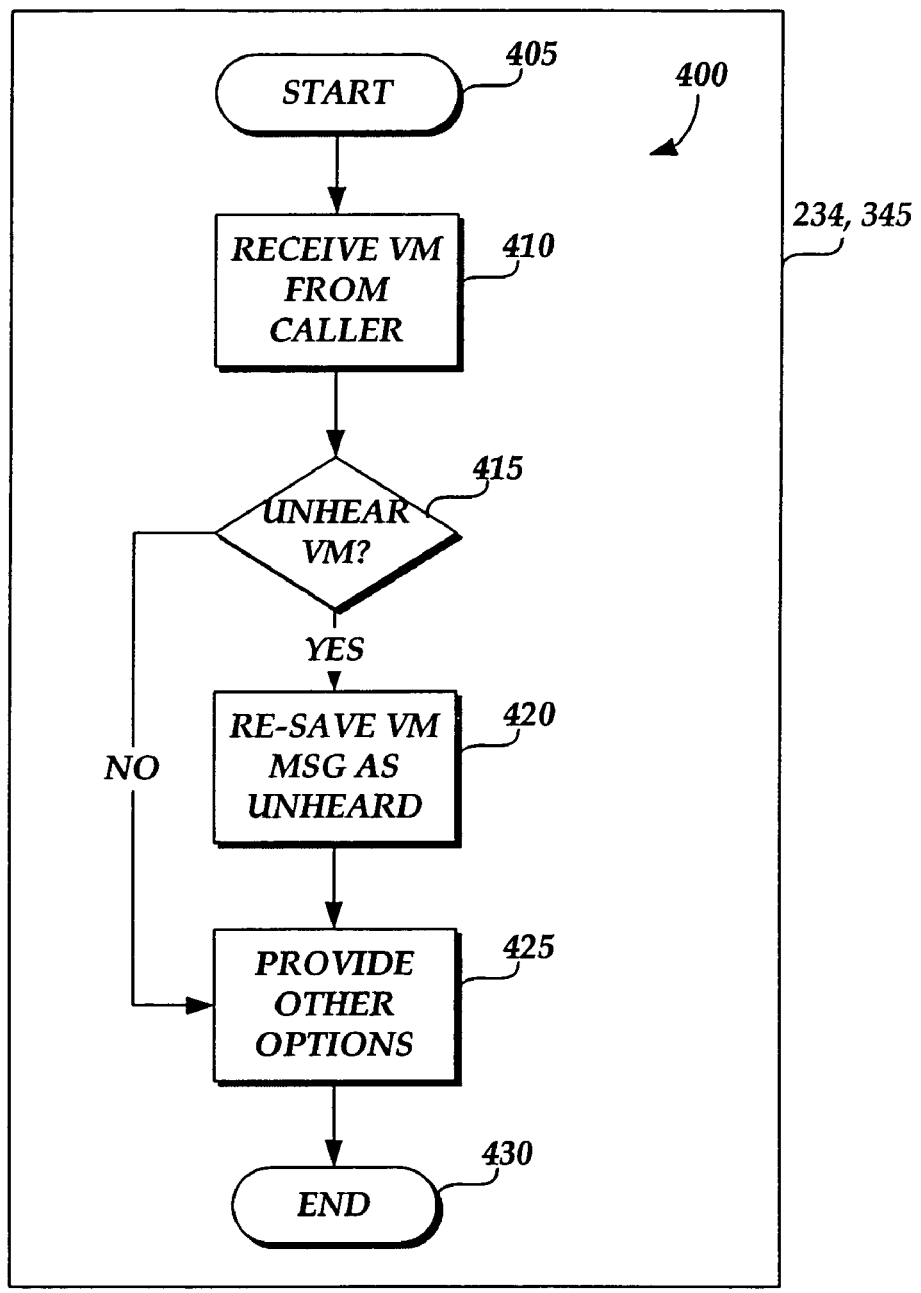
FIG. 4 illustrates a logical flow of the steps performed by a method and system of the present invention for designating a reviewed voicemail message as "unheard" so that an audible or a visual indication of the presence of the voicemail message is presented to the subscriber or other user.

As described with reference to FIGS. 2 and 3, if the subscriber has not deactivated voicemail services, incoming calls from calling parties may be directed to the voicemail system 65 if the subscriber's line is busy or unanswered. FIG. 4 is a logical flow of the steps performed by a method and system of the present invention for designating a reviewed voicemail message as "unheard" so that an audible or a visual indication of the presence of the voicemail message is presented to the subscriber or other user. The method 400 begins at start step 405 and proceeds to step 410 where a voice message is received at the voicemail system 65 of the subscriber and is saved in the subscriber's voicemail box at the voicemail system 65 by the calling party. Once the voicemail message is saved in a subscriber's voicemail box at the voicemail system 65, an audible or visual indication of the presence of the voicemail message is presented to the subscriber at the subscriber's telephone 21. That is, a flashing light or tone may be presented to the subscriber to alert the subscriber of the presence of a new voicemail message in her voicemail box. Upon receiving the audible or visual indication of the presence of a new voicemail message in her voicemail box, the subscriber may enter the voicemail system 65 to listen to the voicemail message. Once the subscriber has listed the voicemail message, the audible or visual indication of the presence of the new voicemail message in the subscriber's voicemail box is extinguished by the voicemail system 65.

At step 415, a determination is made as to whether the subscriber desires to designate the voicemail message as "unheard" so that the audible or visual indication of a new voicemail message will be reactivated and presented to the subscriber with reference to the previously-reviewed voicemail message. In order to make this determination, a prompt may be provided to the subscriber after the subscriber reviews the voicemail message such as "press 5 to 'unhear' this voicemail message." If the subscriber does not desire to designate the reviewed voicemail message as "unheard," the method proceeds to step 425, and the voicemail system 65 provides the subscriber with other options such as "press 7 to save the message, or press 9 to delete the message." The method ends at step 430.

Referring back to step 415, if the subscriber does desire to designate the message as "unheard," the subscriber follows the options provided by the voicemail 65 to designate the voicemail message so that an audible or visual indication of the presence of the voicemail message will be presented to the subscriber or other users having access to the subscriber's voicemail box. At step 420, the voicemail message is saved in the voicemail box and the audible or visual indication of the presence of the voicemail message in the voicemail box is reactivated for presentation to the subscriber or other users. At step 425, other options are provided to the subscriber including the options to delete, save, or skip voicemail messages, and the method ends at step 430.

As described, a method and system are provided for allowing a subscriber of voicemail services to selectively deactivate voicemail services during a period in which the subscriber desires that no voicemail messages be left at the subscriber's voicemail system. A method and system are also provided for allowing the subscriber of voicemail services to designate reviewed voicemail messages as "unheard" so that an audible or a visual indication of the presence of a new voicemail message is reactivated for that reviewed message. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method for selectively deactivating voicemail services in a network-based voicemail system, comprising:

receiving instructions at the voicemail system for temporary deactivation of the voicemail services of a subscriber provided by the voicemail system;

receiving a call from a calling party directed to the subscriber at a subscriber's switch;

routing the call to the voicemail system for provision of the subscriber's voicemail services to the calling party;

determining whether the subscriber's voicemail services have been deactivated;

if the subscriber's voicemail services have been deactivated, determining whether a deactivation announcement is available for presentation to the calling party, wherein the deactivation announcement includes a message to the calling party that the subscriber's voicemail services are temporarily deactivated;

if the deactivation announcement is not available for presentation to the calling party, then disconnecting the call from the calling party directed to the subscriber;

providing a voice message to the subscriber;

if the subscriber's voicemail services have not been deactivated, routing the call from the calling party to the subcriber's voicemail services for allowing the calling party to leave a voice message for the subscriber;

providing the subscriber with an indication that the calling party has left a voice message for the subscriber;

after providing the voice message to the subscriber, eliminating an indication that the calling party has left the voice message for the subscriber:

determining whether the voice message provided to the subscriber has been designated as unheard; and if the voice message has been designated as unheard, then reactivating the indication that the calling party has left the voice message for the subscriber.

2. The method of claim 1, further comprising contacting the voicemail system telephonically.

3. The method of claim 1, further comprising contacting the voicemail system via an Internet based website.

4. The method of claim 1, prior to receiving instructions at the voicemail system for temporary deactivation of the voicemail services of a subscriber provided by the voicemail system, further comprising providing a prompt from the voicemail system to the subscriber to temporarily deactivate the subscriber's voicemail services.

5. The method of claim 1, further comprising receiving a request at the voicemail system for a set period of time for the temporary deactivation of the subscriber's voicemail services, wherein the subscriber's voicemail services are automatically reactivated in response to the expiration of the set period of time.

6. The method of claim 1, further comprising receiving, the deactivation announcement at the voicemail system to be played to calling parties routed to the subscriber's voicemail services while the voicemail services are deactivated.

7. The method of claim 6, wherein receiving the deactivation announcement at the voicemail system to be played to calling parties routed to the subscriber's voicemail services while the voicemail services are deactivated includes recording the deactivation announcement at the voicemail system.

8. The method of claim 1, after routing the call to the voicemail system for provision of the subscriber's voicemail services, further comprising determining whether the subscriber's voicemail services have been deactivated for a set period of time.

9. The method of claim 1, further comprising if the deactivation announcement is available for presentation to the calling party, presenting the deactivation announcement to the calling party prior to disconnecting the call from the calling party directed to the subscriber.

10. The method of claim 1, further comprising:
if the subscriber's voicemail services have not been deactivated, routing the call from the calling party to the subscriber's voicemail services for allowing the calling party to leave the voice message for the subscriber.

11. The method of claim 10, further comprising providing the subscriber with the indication that the calling party has left voice message for the subscriber.

12. In an intelligent telecommunications network, a method for selectively deactivating voicemail services provided by a network-based voicemail system, comprising:
provisioning temporary deactivation of the voicemail services of a subscriber provided by the voicemail system at an intelligent network component;
provisioning a termination attempt trigger at a subscriber's switch;
receiving a call from a calling party directed to the subscriber at the subscriber's switch;
querying the intelligent network component for voicemail services deactivation instructions;
at the intelligent network component, determining whether the subscriber's voicemail services have been deactivated;
if the subscriber's voicemail services have been deactivated, playing a deactivation announcement to the calling party, wherein the deactivation announcement includes a message to the calling party that the subscriber's voicemail services are temporarily deactivated;and
if the subscriber's voicemail services have not been deactivated, routing the call from the calling party to the subscriber's voicemail services
for allowing the calling party to leave a voice message for the subscriber, providing the subscriber with an indication that the calling party has left the voice message for the subscriber,
providing the voice message to the subscriber,
after providing the voice message to the subscriber, eliminating the indication that the calling party has left the voice message for the subscriber,
determining whether the voice message provided to the subscriber has been designated as unheard, and
if the voice message has been designated as unheard, then reactivating the indication that the calling party has left the voice message for the subscriber.

13. The method of claim 12, wherein the intelligent network component is a service control point.

14. The method of claim 12, further comprising receiving, the deactivation announcement at the voicemail system to be played to calling parties routed to the subscriber's voicemail services while the voicemail services are deactivated.

15. The method of claim 12, further comprising receiving a request for a set period of time for the temporary deactivation of the subscriber's voicemail services, wherein the subscriber's voicemail services are automatically reactivated in response to the expiration of the set period of time.

16. A network-based voicemail system for selectively deactivating voicemail services, comprising:
means operative to receive a request for temporary deactivation of the voicemail services of a subscriber provided by the voicemail system;
means operative to receive a call from a calling party directed to the subscriber for provision of the voicemail services;
means operative to determine whether the subscriber's voicemail services have been deactivated;
means operative to determine whether a deactivation announcement is available for presentation to the calling party if the subscriber's voicemail services have been deactivated, wherein the deactivation announcement includes a message to the calling party that the subscriber's voicemail services are temporarily deactivated;
means operative to disconnect the call from the calling party directed to the subscriber if the deactivation announcement is not available for presentation to the calling party;
means operative to route the call to the subcriber's voicemail services for allowing the calling party to leave a voice message for the subscriber if the subscriber's voicemail services have not been deactivated;
means operative to provide the subscriber with an indication that the calling party has left the voice message for the subscriber;
means operative to eliminate the indication that the calling party has left a voice message for the subscriber after the subscriber has reviewed the voice message;
means operative to determine whether the reviewed voice message has been designated as unheard; and
means operative to reactivate the indication that the calling party has left the voice message for the subscriber if the voice message has been designated as unheard.

17. The voicemail system of claim 16, further comprising:
means operative to provide the subscriber deactivation options after receiving the request for the temporary deactivation of the subscriber's voicemail services.

18. The voicemail system of claim 16, further comprising:
means operative to receive and record the deactivation announcement to be played to calling parties routed to the subscriber's voicemail services while the voicemail services are deactivated; and
means operative to present the deactivation announcement to the calling party prior to disconnecting the call from the calling party directed to the subscriber if the deactivation announcement is available for presentation to the calling party.

* * * * *